United States Patent [19]

Weatherford

[11] Patent Number: 4,469,343

[45] Date of Patent: Sep. 4, 1984

[54] OCCUPANT PROPELLED MULTI-SPEED THREE-WHEEL VEHICLE

[76] Inventor: Hugh A. Weatherford, 1216 Rodgers Dr., Tarboro, N.C. 27886

[21] Appl. No.: 432,335

[22] Filed: Dec. 23, 1982

[51] Int. Cl.³ .............................................. B62K 5/02
[52] U.S. Cl. .............................. 280/261; 280/281 LP; 280/282
[58] Field of Search ............... 280/259, 260, 261, 281, 280/281 LP, 282

[56] References Cited

U.S. PATENT DOCUMENTS

| | | | |
|---|---|---|---|
| 2,181,665 | 11/1939 | Messamore | 280/259 |
| 4,103,921 | 8/1978 | Brooks et al. | 280/282 |
| 4,198,072 | 4/1980 | Hopkins | 280/281 LP |

FOREIGN PATENT DOCUMENTS 3815 of 1907 United Kingdom ......... 280/281 LP

Primary Examiner—Joseph F. Peters, Jr.
Assistant Examiner—Kenneth R. Rice
Attorney, Agent, or Firm—Mills & Coats

[57] ABSTRACT

The present invention entails a three-wheel vehicle having a main frame structure, a front wheel, a pair of laterally spaced steerable rear wheels, and a seat disposed intermediately between said front and rear wheels. A jack shaft is rotatively mounted rearwardly of the front wheel and is driven by a pedal assembly having a drive shaft rotatively journaled transversely about the axis of the front wheel. Operatively associated with the jack shaft is a multi-speed chain drive that is drivingly interconnected between the pedal assembly and the jack shaft. The jack shaft further includes an output end or side that drivingly connects to the front wheel. Consequently, it is appreciated that torque is transferred from the pedals through a multi-speed chain drive to the rearwardly disposed jack shaft and the torque associated with the output side of the jack shaft is transferred back to the front wheel for driving the same.

8 Claims, 4 Drawing Figures

OCCUPANT PROPELLED MULTI-SPEED THREE-WHEEL VEHICLE

FIELD OF INVENTION

The present invention relates to vehicles and to three-wheel vehicles, especially the type provided with steerable rear wheels. Further, the present invention relates to such a three-wheel vehicle that is provided with a jack shaft and a multi-speed chain drive assembly where torque is transferred from the axis of the front wheel back to the jack shaft and then from the jack shaft back to the front wheel.

BACKGROUND OF INVENTION

Occupant propelled three-wheel vehicles can be very practical and beneficial as a transportation device. Such vehicles are especially practical from a cost point of view because they are lightweight, compact, and are easy to handle and maneuver as well as being easy to maintain.

There are many suitable applications for such an occupant propelled three-wheel vehicle. For example, they can be utilized in industry for transporting personnel from one location in a plant to another. In this regard, it is appreciated that such a small, lightweight occupant propelled three-wheel vehicle would be especially practical in an indoor facility where the danger associated with a vehicle with an internal combustion engine would prohibit such use.

In addition, an occupant propelled three-wheel vehicle of the type being referred to would have other uses. Still in the way of an example, such a vehicle would seem to be ideally suited for certain postal delivery routes. Aside from a business use, an occupant propelled three-wheel vehicle of the character described herein can be used for recreation and/or exercise as well.

For the most part, three-wheel vehicles in the past have employed a front direct drive steerable wheel. The utilization of a front steerable wheel makes such a three-wheel vehicle unstable during a period of time when sharp turns are being made.

In addition, most conventional three-wheel vehicles have used a simple direct front wheel pedal drive like is found on a child's tricycle. This obviously does not make such a vehicle desirable in situations where the same is employed in climbing hills or traveling over other terrain where a multi-speed drive train would assist the rider and minimize the effort required in propelling the vehicle.

SUMMARY AND OBJECTS OF THE INVENTION

The present invention presents a generally low profile occupant propelled three-wheel vehicle that overcomes the disadvantages and shortcomings of conventional three-wheel vehicles. In the present design for an occupant propelled three-wheel vehicle, the same is provided with two rear steerable wheels, while the front wheel is mounted for non-steering movement. A unique multi-speed drive train is provided that allows the occupant of the vehicle to shift between appropriate gear arrangements. To provide for such a multi-speed drive train, a jack shaft is spaced behind the front wheel and is driven from a foot pedal assembly that is rotatively journaled about the axis of the front wheel. Between the foot pedal assembly and the jack shaft there is provided a multi-speed chain and sprocket arrangement that allows the occupant to drive the jack shaft at a selected speed. The jack shaft in turn is drivingly connected to the front wheel.

It is, therefore, an object of the present invention to provide an occupant propelled three-wheel vehicle with a multi-speed drive train.

Another object of the present invention resides in the provision of an occupant propelled, low profile three-wheel vehicle that includes two rear steerable wheels which makes the vehicle stable throughout all phases of operation.

Another object of the present invention resides in the provision of an occupant propelled three-wheel vehicle that is lightweight, compact, stable, and highly maneuverable.

It is also an object of the present invention to provide an occupant propelled three-wheel vehicle of the character referred to above that is provided with a multi-speed drive train that includes a jack shaft spaced behind a front wheel and driven by a foot pedal assembly that is transversely journaled about the transverse axis of the front wheel, and wherein driving torque is transferred from the foot pedal assembly, through a multi-speed drive train arrangement, to the jack shaft, and from the jack shaft back to the front wheel.

Still a further object of the present invention resides in the provision of an occupant propelled three-wheel vehicle of the character referred to above that is provided with a simple and efficient rear wheel steering system that includes two laterally spaced hand levers that are utilized in steering the vehicle.

It is also an object of the present invention to provide an occupant propelled three-wheel vehicle of the character referred to above that is provided with a relatively simple main frame structure for connecting the front wheel with two rear steerable wheels and which supports a seat structure intermediately between the front wheel and two rear wheels.

Other objects and advantages of the present invention will become apparent from a study of the following description and the accompanying drawings which are merely illustrative of the present invention.

DETAILED DESCRIPTION OF THE DRAWINGS

OCCUPANT PROPELLED MULTI-SPEED THREE-WHEEL VEHICLE

Figure 1:
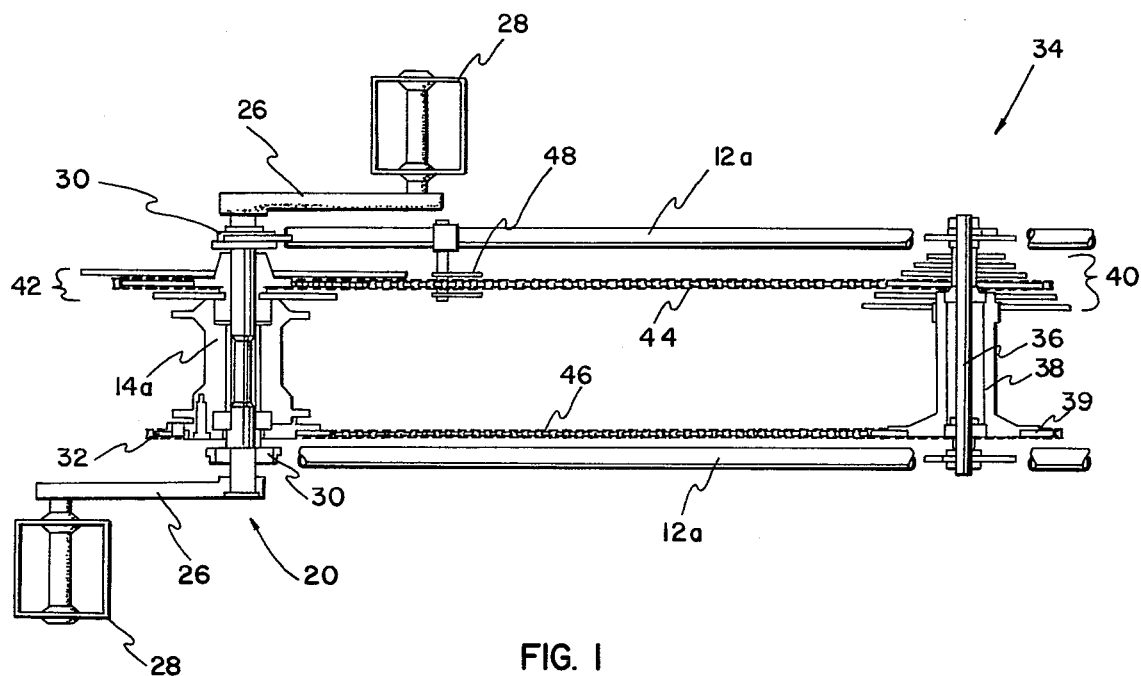
FIG. 1 is a fragmentary diagrammatic illustration of the multi-speed drive train of the three-wheel vehicle of the present invention.
Figure 2:
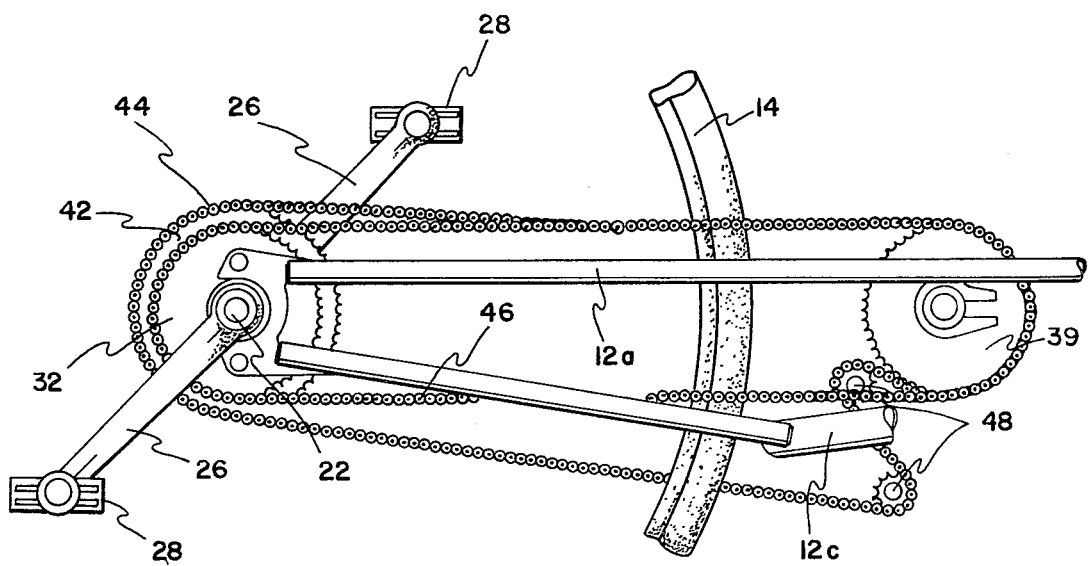
FIG. 2 is a fragmentary side view of the multi-speed drive train illustrated in FIG. 1.
Figure 3:
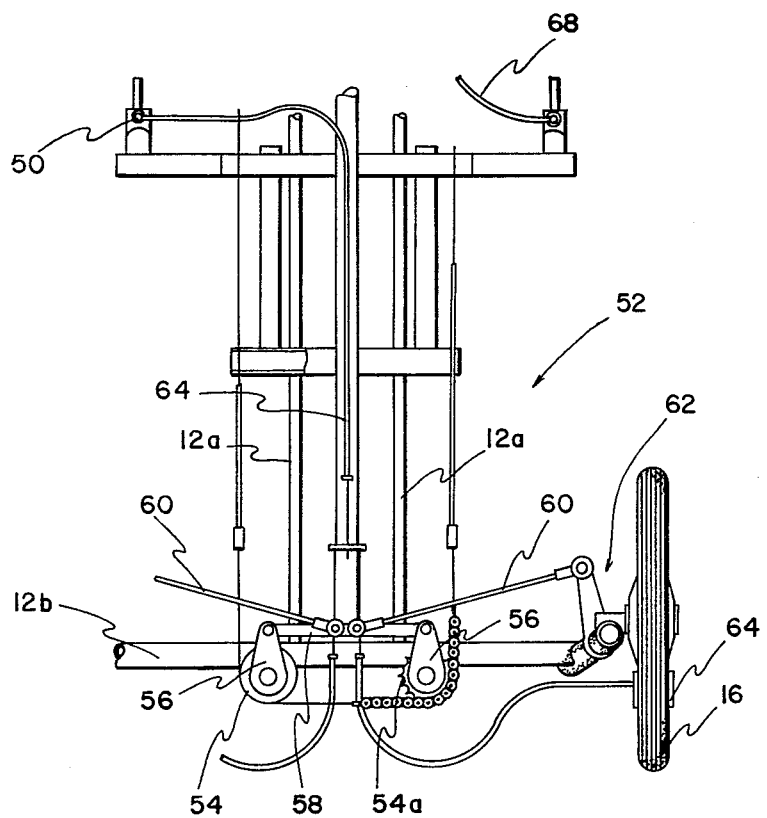
FIG. 3 is a fragmentary plan view of a portion of the three-wheel vehicle of the present invention particularly illustrating the rear steering system thereof.
Figure 4:
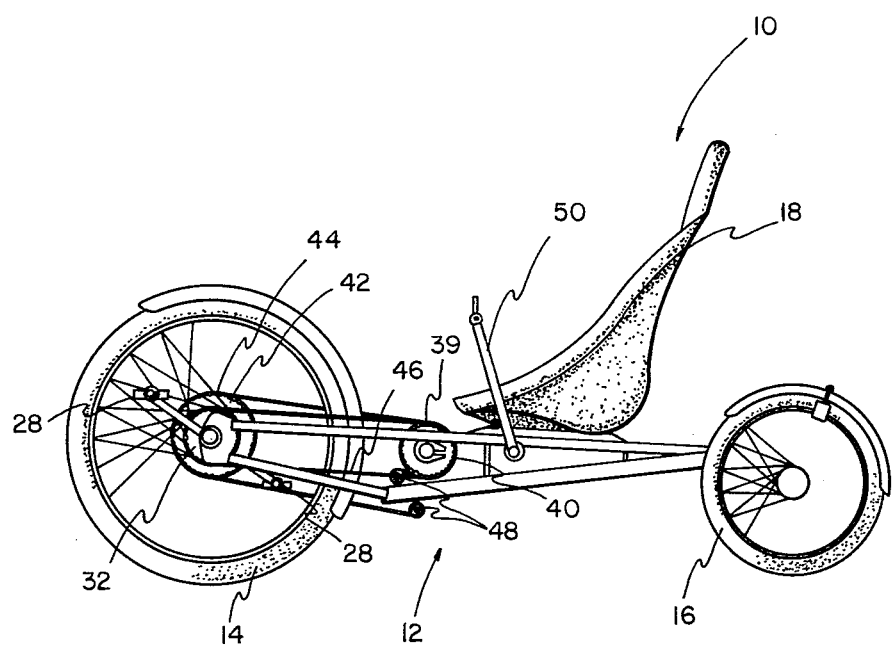
FIG. 4 is a side elevational view of the three-wheel vehicle of the present invention illustrating basic components thereof.

With further reference to the drawings, the three-wheel vehicle of the present invention is shown therein and indicated generally by the numeral 10. Viewing vehicle 10 in detail it is seen that the same includes a main frame structure 12 supported by a non-steerable front wheel 14 and a pair of rear steerable wheels 16. Mounted on the frame structure 12 intermediately between front wheel 14 and rear wheels 16 is an adjustable seat 18.

Main frame 12 includes a pair of laterally spaced upper frame members 12a that extends between front wheel 14 and a rear axle shaft 12b that turns a part of the main frame. Also extending between rear axle shaft 12b and front wheel 14 is a lower longitudinal frame structure 12c that includes a front fork structure that extends to and connects to front wheel 14.

Three-wheel vehicle 10 includes a variable multi-speed front wheel drive assembly. As seen in the drawing, front wheel 14 includes a hub 14a that is effectively supported between the forward ends of lateral upper frame members 12a and the forward ends of the fork portion of the lower frame member 12c.

Rotatively journaled within hub 14a is a foot pedal assembly 20. Foot pedal assembly 20 includes a transverse shaft 22 journaled within bearings 24 interposed between hub 14a and shaft 22. About opposite ends of shaft 22 extends a crank arm 26 which in turn is provided with a pedal 28. Opposite ends of shaft 22 are supported within bearings 30 that are in turn secured to frame structure 12 of the three-wheel vehicle, and particularly connected to the pair of upper frame members 12a and the front ends of the fork portion of the lower frame member 12c.

A hub drive sprocket 32 is rotatively journaled about shaft 22 for rotation about the shaft and is pinned or otherwise connected to hub 14a. Consequently hub drive sprocket 32 can rotate independently of shaft 22 but when driven is operative to drive front wheel hub 14a and consequently front wheel 14.

Transversely mounted between upper frame members 12a and behind front wheel 14 is a jack shaft assembly indicated generally by the numeral 34. Jack shaft assembly 34 includes a shaft 36 rotatively journaled within bearings supported by said upper frame support members 12a. Journaled on shaft 36 is a jack shaft drive hub 38 that includes a sprocket 39 secured about one side thereof. To drive a jack shaft hub 38 and consequently sprocket 39, the three-wheel vehicle of the present invention is provided with a multi-speed drive train assembly for driving front wheel 14. In this regard the multi-speed drive train is similar to a conventional multi-speed chain drive for a bicycle. Thus, details of such will not be dealt with herein because such is well known in the art and is not per se material to the present invention. Briefly however, as seen in the drawings, a chain ring assembly 42 is secured to shaft 22 of foot pedal assembly 20. Chain ring assembly 42 is consequently rotatively driven as said foot pedal assembly 20 is driven.

Aligned with chain ring assembly 42 is a free-wheel assembly 40 that is rotatively journaled about shaft 36 of jack shaft assembly 34. In conventional fashion, a first drive chain 44 is drivingly interconnected between free-wheel assembly 40 and chain ring assembly 42. Also in conventional fashion, a pair of derailleurs 48 is provided and operatively associated with the first chain 44 for effectively transferring the chain to various sprockets of the free-wheel assembly 40 and chain ring assembly 42 in order to achieve a desired speed or gear ratio. Consequently, it is appreciated that driving torque is transferred from pedal assembly 20 to free-wheel assembly 40. From free-wheel assembly 42 torque is transferred to free-wheel assembly 40 via first chain 44. Free-wheel assembly 42 is operatively connected to jack shaft drive hub 38 which in turn includes sprocket 39. Finally, there is provided a final drive chain 46 drivingly interconnected between sprocket 39 and front wheel hub drive sprocket 32. Consequently the torque associated with jack shaft drive hub 38 is transferred to front wheel hub drive sprocket 32 which is effective to drive front wheel 14.

Three-wheel vehicle also includes a rear wheel steering system that is lever actuated. Viewing this part of the present disclosure, it is seen that there is provided a pair of steering and brake levers 50 mounted about opposite sides of seat 18. Steering and brake levers 50 are pivotably mounted about a transverse axis and are movable fore-and-aftly along the sides of seat 18. Each steering and brake lever 50 is operatively connected to opposite ends of a cable-chain assembly 52 that includes a cable and a chain segment trained around an idler 54 and a sprocket 54a. Idler 54 and sprocket 54a are rotatively mounted to the vehicle main frame 12. Idler 54 and sprocket 54a include idler and sprocket arms 56 and a drag link 58 that is operatively connected between arms 56. A pair of tie rods 60 are secured at separate points to drag link 58. The respective tie rods 60 extend outwardly to where opposite ends thereof connect to a wheel spindle assembly indicated generally by the numeral 62. Each wheel spindle assembly is rotatable about a generally vertical axis and is connected to an adjacent rear wheel 16. Consequently, as seen in the drawings, the tie rods 60 act to rotate the wheel spindle assemblies 52 and to impart a like and an appropriate steering action to the two rear wheels 16 in response to the cable assembly 52 being particularly actuated by the steering and brake levers 50.

Further, with respect to the vehicle's braking system, one lever 50 is operative to actuate a rear brake cable assembly 64 that in turn upon actuation is operative to actuate a brake caliper 66 operatively associated with each of the rear wheels 16. The other steering and brake lever 50 is operatively connected to a front wheel cable assembly 68 that in turn is operatively connected to a front wheel caliper brake for braking the front wheel.

From the foregoing specifications, it is seen that the present invention presents a new and unique three-wheel vehicle with a multi-speed drive train that makes the vehicle suited for various terrain and changes in land elevation. Also, the three-wheel vehicle of the present invention is stable because the steering is provided through the rear wheels thereof. Finally, the three-wheel vehicle of the present invention is relatively simple, compact, easy to handle and maneuver, and is very practical in design.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A three-wheel vehicle comprising: a main frame structure; a front wheel rotatively mounted about a transverse axis to the front of said frame structure; a pair of laterally spaced rear steerable wheels mounted to the rear of said frame structure; seat means mounted to said frame structure intermediately between said front and rear wheels; steering means operatively associated with said rear wheels for imparting a steering movement thereto such that said three-wheel vehicle may be steered by said rear wheels; foot pedal means disposed about opposite sides of front wheel and including a drive shaft rotatively journaled along a transverse axis of said front wheel and rotatable independently of said front wheel; a rotatively mounted jack shaft disposed between said front wheel and said rear wheels and including an input side and an output side; first drive means operatively interconnected between said pedal means and said input side of said jack shaft for driving said jack shaft in response to said pedal means being rotatively turned about the transverse axis of said front wheel; multi-speed gear means associated with said jack shaft for driving the same at a selected speed relative to the rotational speed of said pedal means; and second drive means operatively interconnected between said output side of said jack shaft and said front wheel for driving said front wheel in response to the output side of said jack shaft being driven.

2. The three-wheel vehicle of claim 1 wherein said front wheel includes a hub and wherein said drive shaft of said pedal means is rotatively journaled transversely through said hub; and wherein said second drive means operatively interconnecting said jack shaft with front wheel includes a drive sprocket rotatively journaled about the axis of said drive shaft of said pedal means and secured to said hub of said front wheel for driving the same.

3. The three-wheel vehicle of claim 2 wherein said frame structure includes laterally spaced apart side frame assemblies, and wherein said front wheel and said jack shaft are rotatively journaled between said side frame assemblies.

4. The three-wheel vehicle of claim 3, wherein said multi-speed gear means associated with said jack shaft forms a part of said first drive means that operatively interconnects said pedal means with said jack shaft, and wherein said multi-speed gear means includes a series of chain sprockets of various outside diameters secured to said drive shaft of said pedal means, and a second set of chain sprockets secured to said jack shaft and generally aligned with said first set of chain sprockets, and wherein said first drive means includes an endless chain operatively interconnected between said first and second set of chain sprockets and provided with means for selectively connecting certain sprockets of each through said chain so as to achieve a particular desired gear ratio for driving said output side of said jack shaft at a selective rotational speed.

5. The three-wheel vehicle of claim 1 wherein said rear steerable wheels are pivotably mounted about a generally vertical axis and movable about said axis for steering said vehicle, and wherein said steering means includes a pair of levers movably mounted for fore-and-aft movement relative to main frame structure about opposite sides of said seat, and steering actuating means operatively interconnected between said levers and said rear steerable wheels for rotating said rear wheels about said generally vertical axis in response to the selected movement of said levers in order to effectuate steering.

6. The three-wheel vehicle of claim 5 wherein said main frame structure includes a rear transverse support axle having said rear wheels mounted about opposite ends thereof, and wherein each rear wheel includes a vertical support shaft rotatively journaled within a collar supported about the end of said rear transverse axle support, and wherein said steering actuating means includes a pair of rotatively mounted members including an idler and a sprocket, each rotatively mounted member having an arm with said arms being interconnected by a drag link and wherein there is provided a pair of tie rods with each tie rod being connected to said drag link and extending therefrom to where the same connects to a radius arm secured to said vertical support shaft, and wherein said steering actuating means includes a cable-chain assembly connected to said levers and trained around said idler and sprocket and operatively connected to said sprocket such that the movement of said levers results in said sprocket being rotated back and forth by a chain segment forming a part of said cable-chain assembly which in turn causes said rear wheels to be rotated via said vertical support shaft to cause the vehicle to be steered.

7. The three-wheel vehicle of claim 6 wherein the same is provided with a hand actuated caliber type brake including hand actuating means operatively connected about at least one of said levers such that a braking action can be inparted to said three-wheel vehicle in response to said hand actuating being actuated.

8. A three-wheel vehicle comprising; a main frame structure; a front wheel rotatively mounted about a transverse axis to the front of said frame structure; a pair of laterally spaced rear wheels mounted to the rear of said frame structure; seat means mounted to said frame structure intermediately between said front and rear wheels; foot pedal means disposed about opposite sides of said front wheel and including a drive shaft rotatively journaled along a transverse axis of said front wheel and rotatable independently of said front wheel; a rotatively mounted jack shaft disposed between said front wheel and said rear wheels and including an input side and an output side; first drive means operatively interconnected between said pedal means and said input side of said jack shaft for driving said jack shaft in response to said pedal means being rotatively turned about the transverse axis of said front wheel; multi-speed gear means operatively associated with said jack shaft for driving the same at a selected speed relative to the rotational speed of said pedal means; and second drive means operatively interconnected between said output side of jack shaft and said front wheel for driving said front wheel in response to the output side of said jack shaft being driven.

* * * * *